United States Patent Office 3,447,876
Patented June 3, 1969

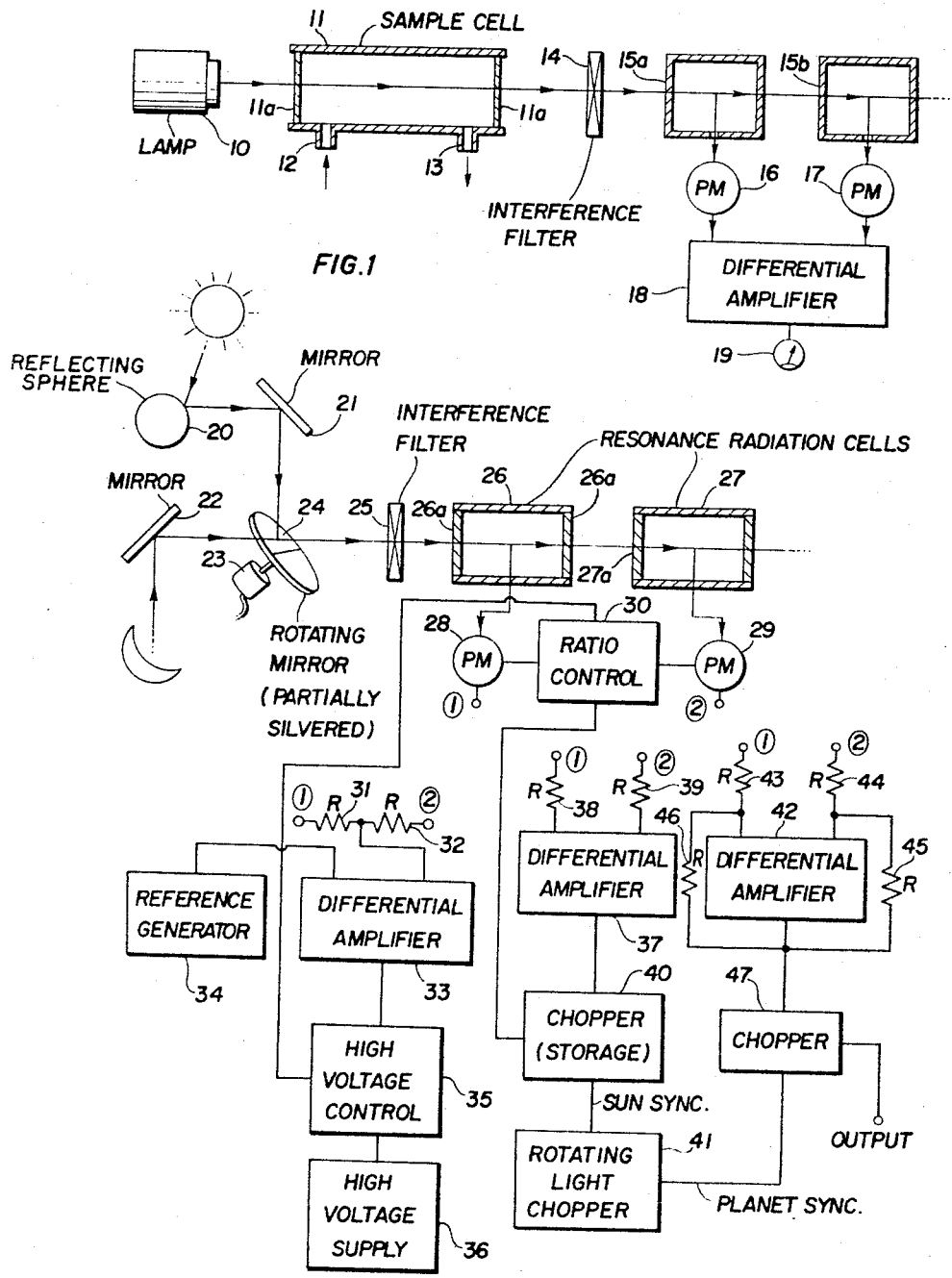

3,447,876
APPARATUS FOR DETECTING
MONATOMIC VAPOURS
Anthony Rene Barringer, Willowdale, Ontario, Canada, assignor to Barringer Research Limited, Rexdale, Ontario, Canada, a corporation
Filed Oct. 11, 1965, Ser. No. 494,552
Int. Cl. G01j 3/50, 3/44; G01n 21/26
U.S. Cl. 356—188                                    6 Claims

ABSTRACT OF THE DISCLOSURE

A spectrometer for measuring monatomic vapours. Light from a lamp is first transmitted through a chamber containing a sample of a vapour to be measured, then through a first resonance radiation cell containing the same vapour, and finally, after passing through the first resonance radiation cell, the light is passed through a second resonance radiation cell containing an isotope of the same vapour, the isotope having an absorption line that is closely adjacent to a predetermined absorption line of the vapour. First and second photosensitive detectors are provided for respectively detecting the level of resonance radiation produced in the first and second resonance radiation cells, and circuit means is provided for indicating the degree of unbalance between the output of the first and second detectors.

---

This invention relates to a method and apparatus for detecting minute traces of substances, and in particular to a spectrophotometer that can be used for both terrestrial spectrophotometric analysis and the analysis of planetary atmospheres.

Spectrophotometric analysis is a method of chemical analysis based upon the absorption of electromagnetic energy at specific wavelengths by atoms or molecules of a substance. A problem with spectrophotometers has been the presence of interfering substances which absorb broadly in the region of the spectrum containing the absorption line or lines of the substance under analysis. The spectrophotometer disclosed herein employs a novel reference against which the absorption by the substance can be compared. The wavelength of the reference is very close to the wavelength of the absorption line of the substance so that interfering substances in general absorb equally at the reference wavelength and at the absorption wavelength.

According to one aspect, the invention consists of a method of detecting the presence of a monatomic vapour of an element in a region, the region being irradiated with light containing energy at the wavelength of an absorption line of the element, the light emerging from the region being deficient in energy at the absorption wavelength when the vapour is present, the method comprising, shining the emergent light through a first resonance radiation cell containing said monatomic vapour of the element and observing the intensity of the resonance re-radiation produced thereby, shining the emergent light through a second resonance radiation cell containing another vapour having an absorption line that is adjacent to the absorption line of the element, and observing the intensity of the resonance re-radiation produced thereby, and comparing the intensities of the resonance re-radiation produced in the first and second resonance radiation cells.

According to another aspect, the invention consists of an apparatus for detecting the presence of a monatomic vapour of an element in a region, the region being irradiated with light containing energy at the wavelength of an absorption line of the element, the light emerging from the region being deficient in energy at the absorption wavelength when the vapour is present, the apparatus comprising, a first resonance radiation cell through which the emergent light is transmitted, the first resonance radiation cell containing said monatomic vapour of the element, a detector for measuring the intensity of resonance re-radiation produced in the first resonance radiation cell, a second resonance radiation cell through which the emergent light is transmitted, the second resonance radiation cell containing another vapour having an absorption line that is adjacent to the absorption line of the element, a second detector for measuring the intensity of resonance re-radiation produced in the second resonance radiation cell, and means for differentially comparing the intensities of the resonance re-radiation produced in the first and second resonance radiation cells. The respective vapours present in the first and second resonance radiation cells are preferably different isotopes of the same element, and their respective absorption wavelengths are very nearly equal. The outputs of the two detectors are initially balanced. If one of the isotopes is present in the region, the output of the two detectors becomes unbalanced, and the degree of unbalance is proportional to the number of absorbing atoms present in the region. If both isotopes are present in the region, the output of the two detectors is again unbalanced provided that the isotope ratio is not unity.

Objects of the invention are to provide a spectrophotometer that is sensitive, accurate and relatively free from interferences.

Preferred embodiments of the invention are illustrated in the accompanying drawings, wherein:

FIG. 1 is a block diagram of a simplified form of the invention, and

FIG. 2 is a block diagram of a spectrophotometer that is adapted to analyze the atmospheres of planets from a spacecraft.

Referring to FIG. 1, a broadband, collimated light source 10 provides a luminous continuum which is directed through a sample cell 11. The light source 10 can be a black body radiator such as an incandescent lamp, a natural source such as the sun, or any other continuum source which can be collimated and directed through the sample cell 11. The sample cell 11 is closed at both ends by transparent vapour-proof windows 11a, for example of quartz. The vapour to be analyzed can be pumped through the sample cell 11 via an inlet 12 and an outlet 13.

After the light passes through the sample cell 11, it is directed through an interference filter 14 and then through successive resonance radiation cells 15a and 15b respectively. The interference filter 14 has a narrow bandwidth, e.g. of the order of a few angstroms or less, and is centered at the wavelength of an absorption line of the element being analyzed. The resonance radiation cells 15a and 15b have transparent windows at each end, are exhausted to a high vacuum and are backfilled with appropriate vapour. For example, the resonance radiation cell 15a can be filled with vapour of a common isotope of an element, and the resonance radiation cell 15b can be filled with vapour of a less common isotope of the element, chosen to have an absorption line adjacent to the absorption line of the vapour in the resonance radiation cell 15a. In general, isotopes of the same element have absorption lines that are extremely close together, e.g. less than 1 A. and more usually within 0.1 A.

Resonance re-radiation from the respective resonance radiation cells 15a and 15b is sensed by detectors 16 and 17, which can be photomultipliers. The resonance re-radiation is preferably sensed at right angles to the collimated light shining through the resonance radiation cells. The outputs of the detectors 16 and 17 are amplified differentially by a differential amplifier 18, and the gains of the detectors 16 and 17 are balanced so that the output of the differential amplifier 18 is zero when no vapour is present in the sample cell 11. The output of the differential amplifier 18 is displayed by any suitable display device 19 such as a meter or a recorder, which provides an indication of the degree of unbalance between the detectors 16 and 17.

If a quantity of vapour of the element under analysis is introduced into the sample cell 11, then light from the source 10 is absorbed by the vapour at the wavelength of the absorption line or lines of the element, and the relative intensities of the resonance re-radiation of the resonance radiation cells 15a and 15b must then vary accordingly. This can be illustrated by considering the element mercury. The most common isotope of mercury is $Hg_{200}$, and it has an absorption line at 2536.517 A. Another isotope of mercury is $Hg_{202}$, and this isotope has an absorption line at 2536.5285 A. If $Hg_{200}$ vapour is present in the resonance radiation cell 15a and $Hg_{202}$ vapour is present in the resonance radiation cell 15b, the detectors 16 and 17 respectively observe resonance re-radiation at the above two wavelengths and at no others. With no vapour in the sample cell 11, the outputs of the detectors 16 and 17 are balanced so that the output of the differential amplifier 18 is zero. If a quantity of $Hg_{200}$ vapour is present in the sample cell 11, however, light is absorbed at the wavelength of the $Hg_{200}$ absorption line, and therefore the intensity of the resonance re-radiation produced in the resonance radiation cell 15a is correspondingly reduced. The degree of unbalance is displayed by the meter 19 and is proportional to the density of the $Hg_{200}$ vapour in the sample cell 11.

If the unknown vapour in the cell 11 contains two or more isotopes, the isotopic ratio can be determined by utilizing a light source 10 such as a metallic vapour lamp containing the several isotopes. If the isotopic ratio of the element in the lamp is known, and the resonance radiation cells 15a and 15b are balanced as before, the degree of unbalance of the detectors 16 and 17 is a function of the isotopic ratio of the isotopes in the vapour in the sample cell 11. Alternatively, different light sources containing a single isotope each, can be successively employed, and from the several readings the isotopic ratio can be calculated.

The wavelength at which the resonance radiation cell 15b responds constitutes a reference against which the absorption at the other wavelength can be compared. Thus, in general, what is required in the resonance radiation cell 15b is a substance that produces resonance re-radiation at a wavelength that is adjacent to the wavelength of the absorption line of the element being analyzed. For most purposes, the presence of interfering or absorbing substances in the sample cell 11 will not unbalance the detectors 16 and 17 if the wavelength separation of the reference and the absorption line is less than about 1 A., and in the case of some broad absorbers, even wider separation is permissible.

It will be understood that the absorption by the unknown vapour could take place in regions other than that of a sample cell. For example, the vapour could be introduced into a colourless flame such as an oxyacetylene flame that is placed in the path of the collimated light from the source 10. The region could also be the atmosphere of a planet, and an apparatus for analyzing the atmosphere of a planet from a spacecraft is described below.

The apparatus of FIG. 2 is adapted to sense the presence of monatomic vapours of elements present in planetary atmospheres from a spacecraft. By "planetary" is meant such bodies as planets, moons, asteroids and the like, including the planet Earth. It is convenient to use the sun as the source of light. Sunlight that is reflected from the surface of a planet has traversed the atmosphere of the planet twice, and therefore the reflected light contains absorption lines attributable to the presence of monatomic vapours of elements in the atmosphere.

Direct sunlight (i.e. light which reaches the spacecraft directly) is not a perfectly uniform continuum but instead consists of a bright continuum interrupted by thousands of dark absorption lines known as Fraunhoffer lines. The Fraunhoffer lines are believed to originate in the sun's photosphere and chromosphere due to the presence of monatomic vapours of elements. It is therefore necessary to compensate for the relatively low intensity of sunlight at the wavelengths of the Fraunhoffer lines. In addition, the intensity of the sunlight itself might vary, for example, due to sun spot activity. Automatic compensation for these and other factors is provided by the apparatus of FIG. 2.

Referring now to FIG. 2, direct light from the sun is reflected by a ceramic reflecting sphere 20 onto a mirror 21. Indirect light from the planet is reflected by a mirror 22 along the main optical axis of the apparatus. A rotary light chopper 24 consisting of a disc having a silvered portion and a transparent portion, alternately transmits the direct sunlight and the indirect sunlight along the optic axis. The disc 24 may consist of a number of alternately clear and silvered segments to increase the chopping frequency, and the disc 24 is rotated by a motor 23. A narrow bandwidth interference filter 25 passes only a narrow band of light centered at the absorption frequency of the particular element being investigated. The light then successively passes through resonance radiation cells 26 and 27 which are similar to the resonance radiation cells 15a and 15b described above. The resonance radiation cells 26 and 27 contain two different isotopes of the element being investigated.

Resonance re-radiation is measured at right angles to the optic axis by detectors 28 and 29, which can be photomultipliers. The outputs of the detectors 28 and 29 are respectively identified as 1 and 2 in FIG. 2, and for clarity of illustration various connections in the remainder of the circuit which are made to these outputs are also identified as 1 and 2.

The outputs of the detectors 28 and 29 are summed by a resistance summing network consisting of resistors 31 and 32. The junction of the resistors 31 and 32 is connected to one input of a differential amplifier 33, and the opposite ends of the resistors 31 and 32 are respectively connected to the outputs 1 and 2 of the detectors 28 and 29. Each resistor 31 and 32 has a resistance of R, a value which matches the output impedances of the detectors 28 and 29. The other input of the differential amplifier 33 is connected to a reference generator 34 which provides a constant D.C. voltage. The output of the differential amplifier 33 is fed to a high voltage control 35 which controls the supply of high voltage to the detectors 28 and 29. The high voltage is provided by a high voltage supply 36. A ratio control 30, controlled by the high voltage control 35, apportions the high voltage delivered to the detectors 28 and 29 and thus controls their respective gains. The output of the differential amplifier 33 is zero provided that the sum of the output voltages of the detectors 28 and 29 is equal to the level of the reference generator voltage. If the resonance re-radiation intensity varies so that the above relationship is not maintained, the differential amplifier 33 delivers a voltage to the high voltage control 35 and appropriate high voltage compensation is applied to the detectors 28 and 29 to restore the above relationship. Thus, when bright direct sunlight is shining through the resonance radiation cells 26 and 27, the gains of the detectors 28 and 29 are automatically reduced so that the sum of their output voltages is equal to the reference voltage, and similarly when the weaker indirect sunlight is shining through the resonance radiation cells 26 and 27 the gains of the detectors 28 and 29 are appropriately increased.

Resistors 38 and 39, each having a resistance of R, connect the respective outputs 1 and 2 of the detectors 28 and 29 with the inputs of a second differential amplifier 37. The output voltage of the differential amplifier 37 is zero when the outputs of the detectors 28 and 29 are equal. The output voltage of the differential amplifier 37 is fed to the ratio control 30 through an electronic chopper 40. A rotary light chopper 41 synchronizes the chopper 40 with the disc 24 so that the output of the differential amplifier 37 is fed to the ratio control 30 during periods of direct sunlight only (i.e. when direct sunlight is shining through the resonance radiation cells 26 and 27). This arrangement equalizes the levels of the output voltages of the detectors 28 and 29 during periods of direct sunlight. The ratio control 30 is designed to adjust the respective gains of the detectors 28 and 29 to satisfy this condition. A suitable time delay is incorporated into the ratio control 30 so that the particular gain ratio determined during a period of direct sunlight is preserved during the succeeding period of indirect sunlight. Thus, regardless of the colour of the direct sunlight, the outputs of the detectors 28 and 29 are balanced prior to a measurement of indirect sunlight, and will become unbalanced only as a result of absorption occurring in the planetary atmosphere.

A third differential amplifier 42 is responsive to the difference between the output voltages of the detectors 28 and 29 during periods of indirect sunlight, and its output is therefore proportional to the absorption in the atmosphere of the planet. Resistors 43 and 44, each having a resistance of R, connect the respective outputs of the detectors 28 and 29 with the inputs of the differential amplifier 42. A pair of feedback resistors 45 and 46 connect the output of the differential amplifier 42 with the respective inputs. An electronic chopper 47 is synchronized with the rotation of the disc 24 by the rotating light chopper 41 so that the output of the differential amplifier 42 appears at the output of the chopper 47 only during periods of indirect sunlight. The output of the chopper 47 therefore consists of the difference in the levels of the outputs of the detectors 28 and 29, and as indicated above the difference is proportional to the relative absorption of the two isotopes in the planetary atmosphere, provided that the isotopic ratio in the atmosphere is not unity. The output of the chopper 47 could be recorded or fed to suitable telemetry apparatus to relay the information back to earth. In the selection of the isotopes, preference should be given to pairs of isotopes representing the most and least abundant species occurring naturally on earth. It is presumed that similar isotopic ratios will obtain on other planets, although the possibility of unusual isotopic ratios should not be overlooked.

I claim:

1. An apparatus for detecting the presence of a monatomic vapour of an element in a region, the region being irradiated with light containing energy at the wavelength of an absorption line of the element, the light emerging from the region being deficient in energy at the absorption wavelength when the vapour is present, the apparatus comprising:
    a first resonance radiation cell through which the emergent light is transmitted, the first resonance radiation cell containing said monatomic vapour of the element,
    a detector for measuring the intensity of resonance re-radiation produced in the first resonance radiation cell,
    a second resonance radiation cell positioned so that the emergent light is transmitted through it after having passed through said first resonance radiation cell, the second resonance radiation cell containing another vapour having an absorption line that is adjacent to the absorption line of the element,
    a second detector for measuring the intensity of resonance re-radiation produced in the second resonance radiation cell, and
    means connected to said first and second detectors for differentially comparing the intensities of the resonance re-radiation produced in the first and second resonance radiation cells.

2. An apparatus for detecting the presence of a monatomic vapour of an element in a region as claimed in claim 1 wherein the wavelength separation of the absorption lines of the respective vapours in the first and second resonance radiation cells is less than about 1 A.

3. An apparatus for detecting the presence of a monatomic vapour of an element in a region as claimed in claim 1 wherein the monatomic vapour is that of an isotope of an element and the vapour in the second resonance radiation cell is the vapour of another isotope of the element.

4. An apparatus for analyzing the monatomic vapour composition of the atmospheres of planets from a spacecraft, comprising:
    a first resonance radiation cell containing monatomic vapour of an isotope of an element,
    a second resonance radiation cell containing monatomic vapour of another isotope of the element,
    means for alternately transmitting direct sunlight and indirect sunlight through the first and second resonance radiation cells, the indirect sunlight being sunlight which has passed through a planet's atmosphere,
    a first detector for producing a first signal proportional to the intensity of resonance re-radiation in the first resonance radiation cell,
    a second detector for producing a second signal proportional to the intensity of resonance re-radiation in the second resonance radiation cell,
    first circuit means connected to said first and second detectors for varying the sensitivities of the first and second detectors so that their outputs are equal during intervals when direct sunlight is transmitted through the first and second resonance radiation cells,
    second circuit means connected to said first and second detectors for maintaining the sum of the first and second signals at a constant level, and
    third circuit means connected to said first and second detectors for differentially comparing the levels of the first and second signals during intervals in which the indirect sunlight is transmitted through the first and second resonance radiation cells.

5. An apparatus for analyzing the monatomic vapour composition of the atmospheres of planets from a spacecraft as claimed in claim 4 wherein the first and second detectors are photomultipliers connected to a source of high voltage and wherein the first and second signals are maintained at a constant level by varying the high voltage supplied to the photomultipliers in response to variations of the sum of the first and second signals from the level of a fixed reference voltage.

6. An apparatus for analyzing the monatomic vapour composition of the atmospheres of planets from a spacecraft as claimed in claim 5 wherein the means for alternately transmitting direct sunlight and indirect sunlight includes a rotatable disc having a silvered portion and a transparent portion, and wherein the said first circuit means for varying the sensitivities of the first and second detectors is synchronized with the rotation of the disc and varies the high voltage supplied to the photomultipliers.

References Cited

UNITED STATES PATENTS 2,737,591   3/1956   Wright et al.
2,872,588   2/1959   Barton _____ 250—42 X JEWELL H. PEDERSEN, *Primary Examiner.*

F. L. EVANS, *Assistant Examiner.*

U.S. Cl. X.R.

260—43.5, 220, 218; 356—186, 75